United States Patent [19]
van der Lely

[11] 3,977,476
[45] Aug. 31, 1976

[54] SOIL CULTIVATING IMPLEMENTS

[76] Inventor: Cornelis van der Lely, 7, Bruschenrain, Zug, Switzerland

[22] Filed: Aug. 8, 1974

[21] Appl. No.: 495,776

[30] Foreign Application Priority Data

Aug. 15, 1973 Netherlands.................. 7311227

[52] U.S. Cl................................. 172/51; 172/49; 172/52; 172/123; 172/110; 172/439; 172/47
[51] Int. Cl.²............... A01B 33/02; A01B 33/06; A01B 21/06; A01B 63/14
[58] Field of Search................ 172/48, 49, 51, 59, 172/123, 111

[56] References Cited
UNITED STATES PATENTS

| | | | |
|---|---|---|---|
| 1,313,008 | 8/1919 | Oakes | 172/48 |
| 2,582,364 | 1/1952 | Tice | 172/49 |
| 3,616,862 | 11/1971 | van der Lely | 172/49 X |
| 3,638,539 | 2/1972 | Lewis | 172/59 |
| 3,779,320 | 12/1973 | Cantone | 172/123 |

Primary Examiner—George J. Marlo
Attorney, Agent, or Firm—Mason, Mason & Albright

[57] ABSTRACT

An agricultural implement combination has a forward cultivator with soil working blades that rotate about a horizontal axis extending transverse to the direction of travel and a rear harrow having tined soil working members that rotate about upwardly extending shafts positioned in a row also extending transverse to the direction of travel. The cultivator and harrow each have a coupling member and their coupling members are linked by pairs of arms that cross one another when the implement is viewed from the side. A driving system includes a separate transmisson with change speed gearing for the cultivator and the harrow and the input shaft of the cultivator is connectable to a prime mover p.t.o. A telescope shaft connection bridges the two transmissions so that the blades of the cultivator and the tined members of the harrow can be driven from a single p.t.o. The harrow preferably has a supporting roller at the rear to smooth the soil worked first by the cultivator and then by the harrow. The latter can be set by adjusting the roller's connection to the harrow, to work deeper than the layer of soil worked by the cultivator.

7 Claims, 2 Drawing Figures

U.S. Patent   Aug. 31, 1976   3,977,476
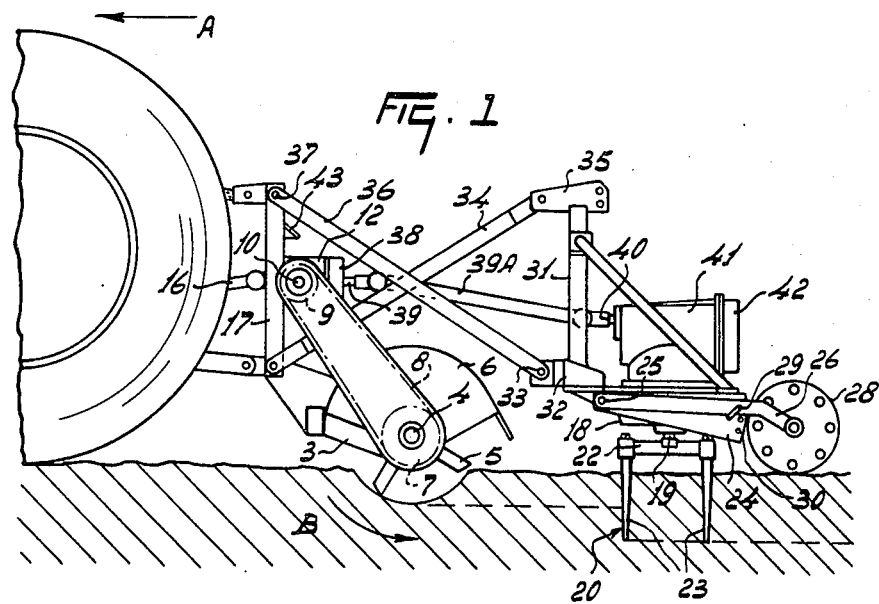
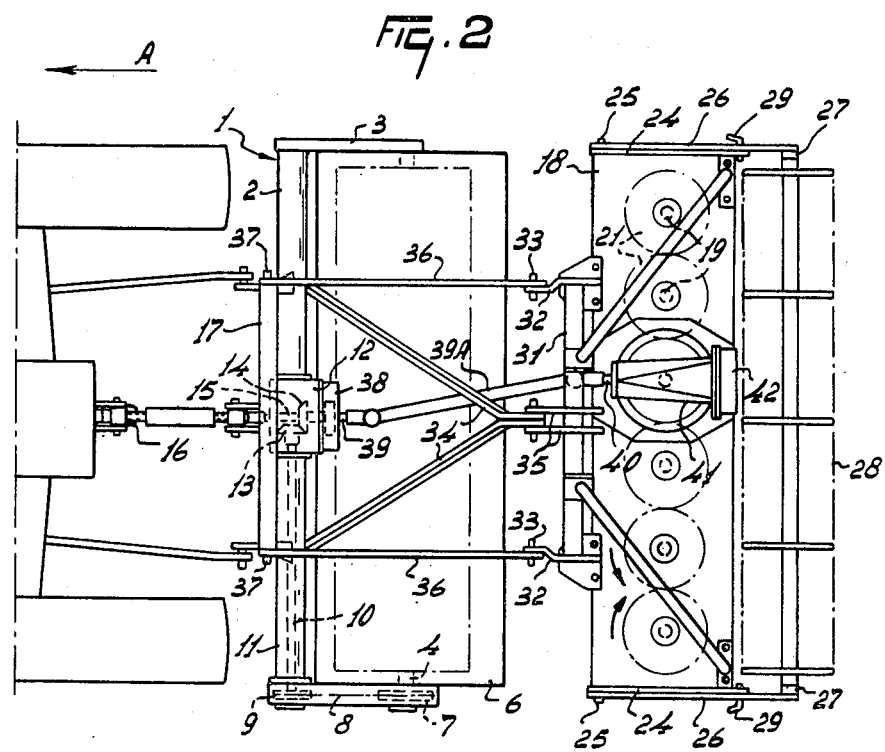

SOIL CULTIVATING IMPLEMENTS

This invention relates to soil cultivating implements or cultivators.

According to one aspect of the invention, there is provided a soil cultivating implement or cultivator comprising at least one soil working member that is arranged to rotate about a horizontal or substantially horizontal axis and at least one soil working member that is arranged to rotate about a vertical or substantially vertical axis.

For a better understanding of the invention, and to show how the same may be carried into effect, reference will now be made, by way of example, to the accompanying drawings, in which:

FIG. 1 is a side elevation of a combination soil cultivating implement or cultivator in accordance with the invention connected to the rear of an agricultural tractor, and FIG. 2 is a plan view corresponding to FIG. 1.

Referring to the drawings, the soil cultivating implement or cultivator that is illustrated is in the form of a combination of a rotary cultivator and a rotary harrow, the rotary cultivator being arranged foremost with respect to the intended direction of operative travel of the combination which is indicated in both Figures of the drawings by an arrow A. As will be evident from FIG. 2 of the drawings, the working widths of the two members of the combination are substantially equal, are substantially coincident and also substantially equal to the width of the path of travel of the agricultural tractor or other vehicle which both moves and operates the combination in the use thereof. The rotary cultivator has a frame that is generally indicated by the reference 1, said frame including a main beam 2 that extends substantially horizontally transverse, and normally perpendicular, to the direction A, supports 3 being rigidly secured to the opposite lateral ends of the main frame beam 2 so as to extend downwardly and rearwardly therefrom with respect to the direction A. The ends of the two supports 3 that are remote from the main frame beam 2 have the opposite ends of a substantially horizontal shaft 4 that is substantially parallel to the main frame beam 2 rotatably journalled in them, said shaft 4 carrying a soil-working rotor that comprises a plurality of soil working members in the form of blades 5 that are fastened to the shaft 4. The rotor is partially surrounded by a screening hood or baffle 6 that is disposed mainly above the rotor with its leading extremity against the main frame beam 2 and its rearmost extremity, with respect to the direction A, behind the rotor. The hood or baffle 6 has substantially vertically disposed lateral side or end plates that lie against the two supports 3.

A sprocket wheel 7 is fastened to the shaft 4 at one end of the rotor and an endless transmission chain 8 is passed around said sprocket wheel 7 and around a further smaller sprocket wheel 9 fastened to one end of a shaft 10. The shaft 10 is substantially parallel to the shaft 4 and is rotatably mounted inside a tubular casing 11 that extends between a casing containing the transmission parts 7, 8 and 9 and a gear box 12 mounted on top of the main frame beam 2 and midway along the length thereof. The tubular casing 11 and the shaft 10 which it contains are thus also located above the main frame beam 2 and parallel to that beam. Substantially horizontal rotary bearings for the shaft 10 are located inside its tubular casing 11 and the end of the shaft that is remote from the sprocket wheel 9 projects into the interior of the gear box 12 and is there provided with a bevel pinion 13. The teeth of the bevel pinion 13 are in driven mesh with those of a further bevel pinion 14 carried by a shaft that extends substantially parallel to the direction A. The leading end of a second shaft 15 that is parallel to the shaft which has just been mentioned projects forwardly from the front of the gear box 12. In the use of the combination, as illustrated in the drawings, the leading splined or otherwise keyed end of the shaft 15 is placed in driven connection with the power take-off shaft of the agricultural tractor or other vehicle which moves and operates the combination by way of an intermediate telescopic transmission shaft 16 that is of a construction which is known per se having universal joints at its opposite ends. The front of the frame beam 2 with respect to the direction A is, provided with a centrally mounted rectangular coupling member 17 having connection points that are employed in coupling the combination to the three-point lifting device or hitch carried at the rear of the operating tractor or other vehicle.

The second member of the combination is the rotary harrow which comprises a hollow box-shaped frame portion 18 that extends substantially horizontally transverse, and normally substantially perpendicular, to the direction A. A plurality of vertical or substantially vertical shafts 19, of which there are six in the example illustrated in the accompanying drawings, are rotatably journalled in the frame portion 18 at regularly spaced apart intervals which conveniently, but not essentially, have magnitudes of substantially 25 cms. The lowermost end of each shaft 19 projects from beneath the hollow frame portion 18 and carries a corresponding soil working member that is generally indicated by the reference 20. The six shafts 19 are provided, inside the hollow frame portion 18, with corresponding straight- or spur-toothed pinions 21 whose dimensions and arrangement are such that the teeth of each pinion 21 are in mesh with those of its neighbour, or both of its neighbours, in the single row thereof. Each soil working member 20 includes a substantially horizontally disposed tine support 22 that is rigidly secured at its midpoint to the lowermost end of the corresponding shaft 19. The opposite ends of each tine support 22 carry substantially vertically disposed sleeve-like tine holders which releasably receive fastening portions at the uppermost ends of corresponding pairs of rigid soil working tines 23.

The opposite lateral sides or ends of the hollow frame portion 18 are closed by substantially vertically disposed sector plates 24 and two arms 26 are turnable upwardly and downwardly alongside the two sector plates 24 about substantially horizontally aligned stub shafts 25 that are located at the leading ends of said plates 24 with respect to the direction A. Rearmost end regions of the two arms 26 are bent over downwardly to some extent and a supporting member in the form of a ground roller 28 is rotatably mounted between said ends with the aid of horizontal bearings 27 that cooperate with the opposite ends of a central shaft of the roller. The rearmost edges of the sector plates 24 with respect to the direction A are formed with curved rows of holes 30, the centers of curvature of said rows being coincident with the axis defined by the stub shafts 25. The two arms 26 are formed with single holes that are located at the same distance from the axis which has just been mentioned as are the holes 30 and horizontal locking pins 29 or equivalent bolts or the like are provided for entry through the single holes in the arms 26 and chosen holes 30 to maintain the arms 26 in corresponding angular settings about the stub shafts 25 so that the axis of rotation of the roller 28 that is coincident with the longitudinal axis of its central shaft is maintained at the desired level relative to the remainder of the rotary harrow. It will be apparent from FIG. 1 of the drawings that, since the roller 28 serves to support the rotary harrow during its progress over the ground, the level of its axis of rotation relative to the remainder of the harrow is a principal factor in determining the depth of penetration of the foregoing tines 23 into the soil during the use of the combination. The axis of rotation of the ground roller 28 is parallel or substantially parallel to an imaginary straight line adjoining the axes of rotation of all six of the shafts 19 at the same level along each of those shafts.

The front of the frame portion 18 of the rotary harrow with respect to the direction A has a coupling member 31 of generally triangular configuration secured to it, the connection being strengthened by tie bars that extend downwardly and rearwardly with respect to the direction A from the opposite sides of the coupling member 31 in rearwardly divergent relationship, the rearmost ends of said tie bars being fastened to the top and rear of the frame portion 18 close to the two sector plates 24. Two horizontally spaced apart plates 32 project forwardly from the remainder of the coupling member 31 at the foot thereof, the leading ends of said plates 32 being provided with substantially horizontally aligned stub shafts 33. As will be evident from the drawings, the coupling member 17 of the rotary cultivator is pivotally connected to the coupling member 31 of the rotary harrow when the combination is operatively established. To this end, two arms 34 have their leading ends pivotally connected to the foot of the coupling member 17 and extend upwardly and rearwardly therefrom with respect to the direction A in rearwardly convergent relationship, their uppermost and rearmost ends being in contact and being pivotally mounted between a pair of horizontally spaced apart coupling plates 35 carried at the apex of the coupling member 31. It will be noted from the drawings that the two arms 34 extend beneath the main frame beam 2 of the rotary cultivator but above the screening hood or baffle 6 thereof. Two further substantially parallel arms 36 have their leading ends pivotally connected to the top of the coupling member 17 of the rotary cultivator by substantially horizontally aligned pivot pins 37, said arms 36 extending downwardly, and rearwardly with respect to the direction A, from the pivot pins 37 to locations at which their lowermost and rearmost ends are pivotally connected to the two stub shafts 33. As seen in side elevation (FIG. 1), the arms 34 cross the arms 36, said arms 34 and 36 providing a connection between the frame 1 of the rotary cultivator and the frame portion 18 of the rotary harrow which is such that said frame and frame portion can move upwardly and downwardly relative to each other. The working depths of those two soil cultivating implements can thus be adjusted independently of one another.

A change-speed gear 38 is provided at the rear of the gear box 12 of the rotary cultivator and the shaft 15 and the shaft that carries the bevel pinion 14 project into its casing. It is not necessary to describe the construction and operation of the change-speed gear 38 in detail but, briefly, it is provided with a plurality, such as four, of interchangeable and/or exchangeable toothed pinions and will give different transmission ratios between the shaft 15, which is integral or rigid with an output shaft 39 of the gear box, and the shaft which carries the bevel pinion 14 in dependence upon the particular pinions and/or pinion arrangements that are chosen. The rearmost end of the output shaft 39 is splined or otherwise keyed to enable it to be placed in driving connection with the leading end of a telescopic transmission shaft 39A that is of a construction which is known per se having universal joints at its opposite ends. The rearmost end of the telescopic transmission shaft 39A drives an input shaft 40 of a gear box 41 that is mounted on top of the frame portion 18 of the rotary harrow above one of the center pair of soil working members 20. The shaft 19 that corresponds to the soil working member 20 which has just been mentioned has an upward extension into the gear box 41 and the input shaft 40 drives that shaft by way of pinions contained within the gear box and further pinions contained within a second change-speed gear 42 that is fastened to the rear of the gear box 41. The particular pinions and/or pinion arrangements that are chosen for the change-speed gear 42 govern the speed of rotation of the soil working members 20 in response to a single input speed of rotation applied to the shaft 40. It will be apparent from the drawings that the shaft 40 extends substantially parallel to the direction A.

In the use of the combination soil cultivating implement or cultivator that has been described, the coupling member 17 of the leading rotary cultivator is connected to the three-point lifting device or hitch of the operating agricultural tractor or other vehicle and the forwardly projecting end of the shaft 15 of its gear box 12 is placed in driven connection with the power take-off shaft of the same tractor or other vehicle in the manner described above by employing the telescopic transmission shaft 16. The coupling member 31 of the rotary harrow is connected to the coupling member 17 of the rotary cultivator by the arms 34 and 36 and the telescopic transmission shaft 39A is arranged to connect the shaft 39 drivingly to the shaft 40. As the combination moves over the ground in the direction A, the rotor of the leading rotary cultivator is rotated in a direction which is such that its blades 5 move rearwardly through the soil in the direction B indicated by an arrow in FIG. 1 of the drawings and intensively break up or crumble an upper layer of the soil having a depth of the order of substantially 10 cms. The immediately following soil working members 20 of the rotary harrow are revolving about substantially vertical axes with the two members 20 of each neighbouring pair thereof rotating in opposite directions as is indicated by arrows in FIG. 2 of the drawings in respect on one such neighbouring pair. However, the tines 23 of the soil working members 20 project further into the soil so that, in addition to further crumbling the already worked uppermost layer of top soil, they also break up or crumble the immediately subjacent layer thereof. The effect of the tines 23 is such that they do not seal the sub-soil to any significant extent, if at all, so that, after the combination has passed, the soil is left with a finely divided uppermost layer, a broken up but not so finely divided immediately subjacent layer which directly joins the sub-soil along natural fracture lines. A soil structure that is very suitable for the introduction and subsequent germination of seeds is thus produced, the soil being well aerated and having good water circulation and economy. Appropriate adjustments of the two change-speed gears 38 and 42 enable the speeds of movement of the blades 5 and the tines 23 through the soil to be chosen in accordance with factors such as the nature and condition of the soil that is to be worked and the prevailing weather.

As previously mentioned, the combination is partly supported from the ground, during its use, by the ground roller 28 at the rear of the rotary harrow, the level of the axis of rotation of said roller 28 having previously been set relative to the remainder of the rotary harrow to govern the depth of penetration of the tines 23 into the soil. Adjustment of the working depth of the leading rotary cultivator is attained by upward and downward adjustment of at least one ground wheel (not shown) arranged on the cultivator or by setting the level of the lifting links of the three-point lifting device or hitch of the operating tractor or other vehicle. The particular combination that has been described has the advantage that the two implements of which it is composed can be used entirely separately and independently of each other. It is only necessary to remove the arms 34 and 36 temporarily and it is then possible to connect either of the two implements alone to the three-point lifting device or hitch of an operating tractor or other vehicle and to drive the implement in question from the power take-off shaft of the same tractor or other vehicle. This is clearly an advantage inasmuch as either of the two implements can be used on its own without the other but the combination can be readily established, when required, to produce an effect which is superior to using the two implements separately, one after the other, with the additional advantage of being more economic than performing two separate operations. In addition to performing its supporting function, the ground roller 28 at the rear of the rotary harrow, gently compresses the soil worked by the foregoing blades 5 and tines 23 crushing any lumps of soil not previously broken up and producing a firm surface that is ready for the introduction of seeds. When the combination is to be transported from one place to another without performing any working operation, it can be raised entirely clear of contact with the ground by elevating the three-point lifting device or hitch of the agricultural tractor or other vehicle to which it is coupled. Stops 43 are provided on the upright sides of the coupling member 17 of the rotary cultivator and, under the transport conditions which have just been mentioned, the arms 36 will bear against those stops 43 and prevent the rotary harrow from turning downwardly beyond the limit which they define when the three-point lifting device or hitch of the agricultural tractor or other vehicle is fully raised.

While it is preferred to form the soil cultivating implement or cultivator as a combination of two basically separate implements in the manner that has been described, in order to attain the advantages that have been discussed above, this is not essential and the soil cultivating implement or cultivator may, if desired, be constructed as a permanently constituted single unit ideally suitable for use in preparing soil for the sowing of seeds. Although various features of the soil cultivating implement or cultivator that has been described and that is illustrated in the accompanying drawings will be set forth in the following claims as inventive features, it is emphasised that the invention is not necessarily limited to those features and that it includes within its scope each of the parts of the soil cultivating implement or cultivator that has been described and that is illustrated in the accompanying drawings both individually and in various combinations.

What we claim is:

1. An agricultural implement movable over the ground comprising a combination of a rotary cultivator and a rotary harrow, said rotary cultivator being arranged in front of said rotary harrow and having a frame supporting a plurality of soil working elements rotatably mounted on a substantially horizontal transverse axis, said harrow comprising a frame portion supporting a plurality of soil working members arranged in a transverse row and rotatably mounted on corresponding upwardly extending axes, a first upwardly extending coupling member being connected to the front of said frame, a second upwardly extending coupling member being connected to said frame portion said coupling members being interconnected by pivoted arms, said cultivator and said harrow being vertically movable with respect to one another during travel, a driving system being in driving engagement with said elements via a transmission of said cultivator and with the soil working members via a further transmission of said harrow.

2. An implement as claimed in claim 1, wherein said elements are blades that are set to work the soil at a lesser depth than tines of said soil working members of said harrow.

3. An implement as claimed in claim 1, wherein an input shaft of said driving system is connected to the transmission of said cultivator and the further transmission of said harrow is connected to the rear of said first mentioned transmission.

4. An implement as claimed in claim 1, wherein said harrow comprises a plurality of tined soil working members that are positioned side by side in a row and said driving system is connected to rotate each soil working member in a direction opposite to that of an adjacent soil working member, said tined soil working members being positioned to work overlapping strips of soil and the working width of said cultivator being substantially equal to the working width of said harrow.

5. An implement as claimed in claim 1, wherein said arms include a first pair of rearwardly converging arms which extend from a lower portion of said first coupling member, and a second pair of substantially parallel arms that extend from the upper portion of said first coupling member to the lower portion of said second coupling member.

6. An agricultural implement movable over the ground comprising a combination of a rotary cultivator and a rotary harrow, said rotary cultivator being arranged in front of said rotary harrow and having a frame supporting a plurality of soil working blade elements rotatably mounted on a substantially horizontal transverse axis, said harrow comprising a frame portion supporting a plurality of soil working tined members arranged in a row and said tined members being rotatably mounted on corresponding upwardly extending axes, a first upwardly extending coupling member being connected to the front of said frame and a second upwardly extending coupling member being connected to the front of said frame portion, said coupling members being interconnected by pivoted arms, said cultivator and said harrow being vertically movable with respect to one another during travel, a driving system being in driving engagement with said elements via a transmission of said cultivator and with the tined members via a further transmission of said harrow.

7. An agricultural implement comprising a combination of a rotary cultivator and a rotary harrow, said cultivator being arranged in front of said rotary harrow and having a frame supporting a plurality of soil working elements rotatably mounted on a substantially horizontal transverse axis, said harrow comprising a frame portion supporting a plurality of soil working tined members arranged in a transverse row and said tined members being rotatably mounted on corresponding upwardly extending axes, a first upwardly extending coupling member being connected to the front of said frame and a second upwardly extending coupling member being connected to the front of said frame portion, said coupling members being interconnected by pivoted arms that link the upper portion of said first coupling member to the lower portion of said second coupling member and vice versa, said cultivator and said harrow being vertically movable with respect to one another during operation, a driving system being in driving engagement with said elements via a transmission of said cultivator and with said tined members via a further transmission of said harrow.

* * * * *